(12) United States Patent
Wilt

(10) Patent No.: US 8,395,631 B1
(45) Date of Patent: Mar. 12, 2013

(54) METHOD AND SYSTEM FOR SHARING MEMORY BETWEEN MULTIPLE GRAPHICS PROCESSING UNITS IN A COMPUTER SYSTEM

(75) Inventor: Nicholas Patrick Wilt, Rochester, NY (US)

(73) Assignee: NVIDIA Corporation, Santa Clara, CA (US)

( * ) Notice: Subject to any disclaimer, the term of this patent is extended or adjusted under 35 U.S.C. 154(b) by 968 days.

(21) Appl. No.: 12/433,799

(22) Filed: Apr. 30, 2009

(51) Int. Cl.
*G09G 5/39* (2006.01)
*G06F 15/16* (2006.01)
*G06F 15/167* (2006.01)

(52) U.S. Cl. .................. 345/531; 345/502; 345/541
(58) Field of Classification Search .................. None
See application file for complete search history.

(56) References Cited

U.S. PATENT DOCUMENTS

| 6,891,543 | B2 * | 5/2005 | Wyatt ........................ 345/541 |
| 7,475,197 | B1 * | 1/2009 | Bouge et al. .................. 711/153 |
| 2006/0267990 | A1 * | 11/2006 | Rogers et al. ................ 345/502 |
| 2008/0030510 | A1 | 2/2008 | Wan et al. |
| 2008/0276220 | A1 | 11/2008 | Munshi et al. |
| 2009/0059788 | A1 * | 3/2009 | Granovsky et al. ......... 370/235 |
| 2010/0118041 | A1 * | 5/2010 | Chen et al. .................... 345/542 |

FOREIGN PATENT DOCUMENTS

| WO | WO 2008/127610 | 10/2008 |
| WO | WO 2008/127622 | 10/2008 |
| WO | WO 2008/127623 | 10/2008 |

OTHER PUBLICATIONS

Moss, et al. "Toward Acceleration of RSA Using 3D Graphics Hardware," LNCS 4887, Dec. 2007, pp. 369-388.
Eggers, et al. "Simultaneous Multithreading: A Platform for Next-Generation Processors," IEEE Micro, vol. 17, No. 5, pp. 12-19, Sep./Oct. 1997.
Office Action dated May 22, 2012 for U.S. Appl. No. 12/433,797.

* cited by examiner

*Primary Examiner* — Kee M Tung
*Assistant Examiner* — Sing-Wai Wu
(74) *Attorney, Agent, or Firm* — Patterson & Sheridan, LLP

(57) ABSTRACT

One or more embodiments of the invention set forth techniques to allocate a memory buffer in the system memory of a computer system that is shared among a plurality of graphics processing units (GPUs) in the computer system. The GPUs are able to engage in Direct Memory Access (DMA) with the memory buffer thereby eliminating additional copying steps that have been needed to combine data output of the various GPUs without such a shared memory buffer.

20 Claims, 6 Drawing Sheets

METHOD AND SYSTEM FOR SHARING MEMORY BETWEEN MULTIPLE GRAPHICS PROCESSING UNITS IN A COMPUTER SYSTEM

BACKGROUND OF THE INVENTION

1. Field of the Invention

The present invention relates generally to graphics processing units (GPUs) and more specifically to sharing data among GPUs in a multi-GPU computer system.

2. Description of the Related Art

Current computer systems are typically configured with the hardware capability to support multiple graphics processing units (GPUs) through a compatible bus interface, such as PCI Express. Multiple GPUs in a computer system can share and subdivide a computationally expensive workload such as rendering a 3D scene. To increase processing efficiencies and memory management performance, each GPU is typically capable of engaging in Direct Memory Access (DMA) with memory of the computer system (also referred to herein as the system memory) that has been allocated to an application running on the computer system (i.e., also referred to herein as the application's address space). For example, an application running on the computer system can allocate a memory buffer in its address space and request that a GPU performing a particular task read input data needed to perform the task directly from (and write the output data results of the task directly to) the memory buffer. Such DMA capabilities eliminate an extra copying step that the application would have been required to perform in order to write the input data to a special memory location accessible by the GPU outside the application's address space. Typically referred to as "pinned memory," the memory buffer is specially allocated by an application to be non-pageable so that it cannot be repurposed by the operating system's virtual memory optimization techniques. Because any paging of the memory buffer by the CPU would not be recognized by the GPU, the GPU could read or write data into the memory buffer at a time when the CPU had repurposed the memory buffer due to paging, thereby corrupting data in the buffer.

Current pinned memory allocation techniques enable application developers to allocate a pinned memory buffer that is accessible only to a particular process running on a particular GPU (referred to herein as a "context"). However, an application developer creating multi-GPU aware applications will divide a workload among the multiple GPUs by broadcasting different subsets of the input data to multiple GPUs and desire to gather the output data into a single memory buffer. While each of the processes performing the workload on each of the GPUs may each have their own pinned memory buffer, to date, the application must still copy the results in each pinned memory buffer into a single consolidated memory buffer.

As the foregoing illustrates, what is needed in the art is a technique enabling multiple GPUs in a computer system to share a memory buffer without separate explicit per-GPU buffer allocations and copies between such per-GPU buffers.

SUMMARY OF THE INVENTION

One or more embodiments of the present invention provide methods for allocating a memory buffer in a system memory of a computer system that can be shared and accessed among multiple GPUs through DMA. Such methods eliminate copying steps that would have been needed to combine data outputs from the multiple GPUs without such a shared memory buffer.

According to one embodiment of the present invention, a computer implemented method for allocating a memory buffer within a system memory of a computer system that is configured to be shared among a plurality of GPUs included in the computer system is disclosed herein. The method comprises maintaining a list of processes executing on the plurality of GPUs, wherein each process in the list of processes has access to all shared memory buffers in the system memory, maintaining a list of address range entries, wherein each address range entry in the list of address range entries comprises an address range for a different shared memory buffer in the system memory, allocating a page-locked memory buffer in the system memory, for each GPU executing one or more processes in the list of processes, for each of the one or more processes executing on the GPU, requesting that the GPU map the page-locked memory buffer into a virtual address space associated with the process; and adding an entry to the list of entries that comprises the address range of the page-locked memory buffer, wherein each process having the page-locked memory buffer mapped into an associated virtual address space has access to the page-locked memory buffer.

One advantage of the disclosed method is that multi-GPU aware applications can subdivide workloads to be performed on multiple CPUs and achieve greater performance by requesting the multiple GPUs to directly output their data into the shared memory buffer through DMA. The disclosed method further eliminates superfluous copying steps when GPUs are integrated with the CPU and share the same physical memory and also provides opportunities for multiple CPUs to engage in peer-to-peer memory copies using the shared memory buffer without involvement of the CPU in the computing system.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
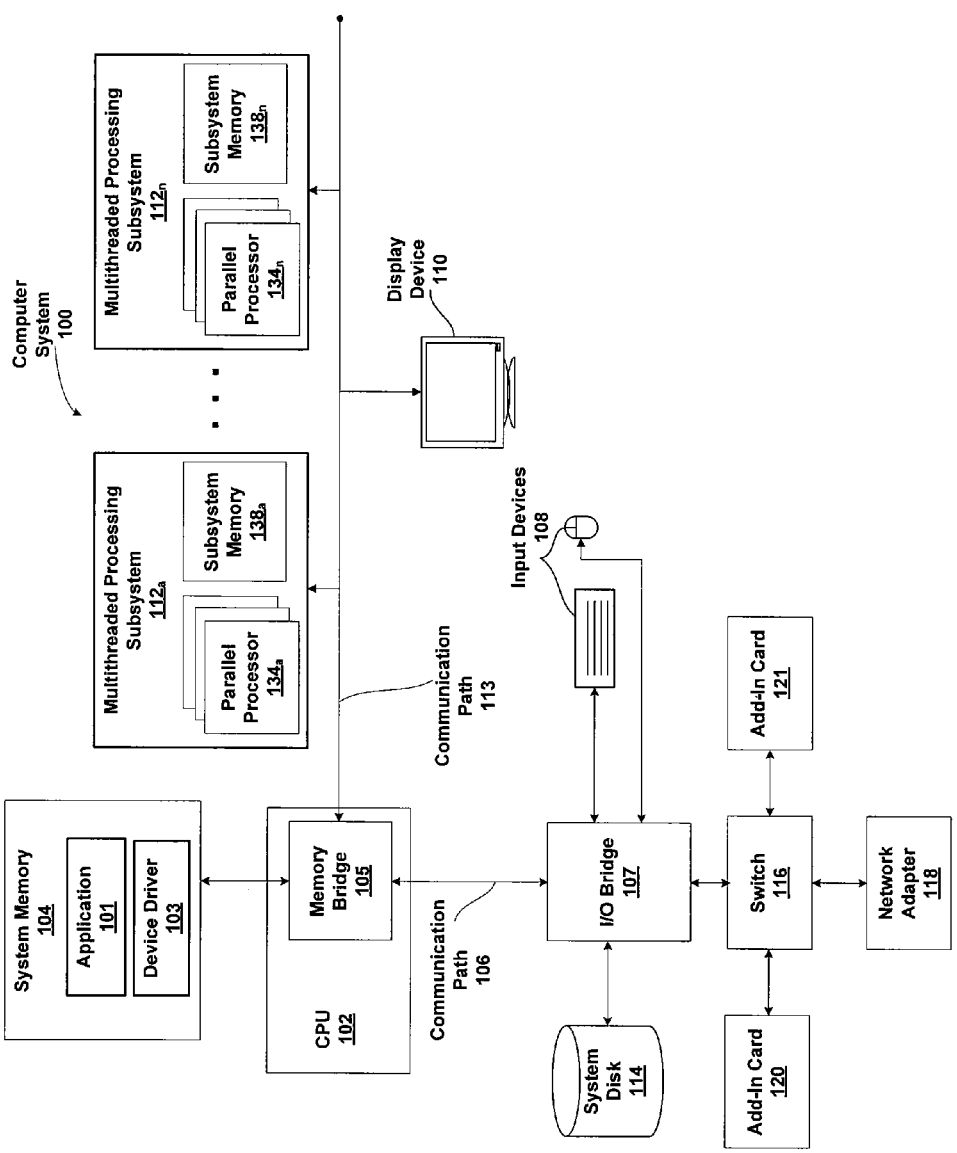
FIG. 1 is a block diagram of a multi-GPU computer system configured to implement one or more aspects of the present invention.

FIG. 1 is a block diagram of a multi-GPU computer system configured implement one or more aspects of the present invention. Computer system 100 includes a CPU 102 and a system memory 104 communicating via a bus path that includes a memory bridge 105. Memory bridge 105, which may be, e.g., a northbridge chip, is connected via a bus or other communication path 106 (e.g., a HyperTransport link) to an I/O (input/output) bridge 107. I/O bridge 107, which may be, e.g., a southbridge chip, receives user input from one or more user input devices 108 (e.g., keyboard, mouse) and forwards the input to CPU 102 via path 106 and memory bridge 105. A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 2 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

Figure 2:
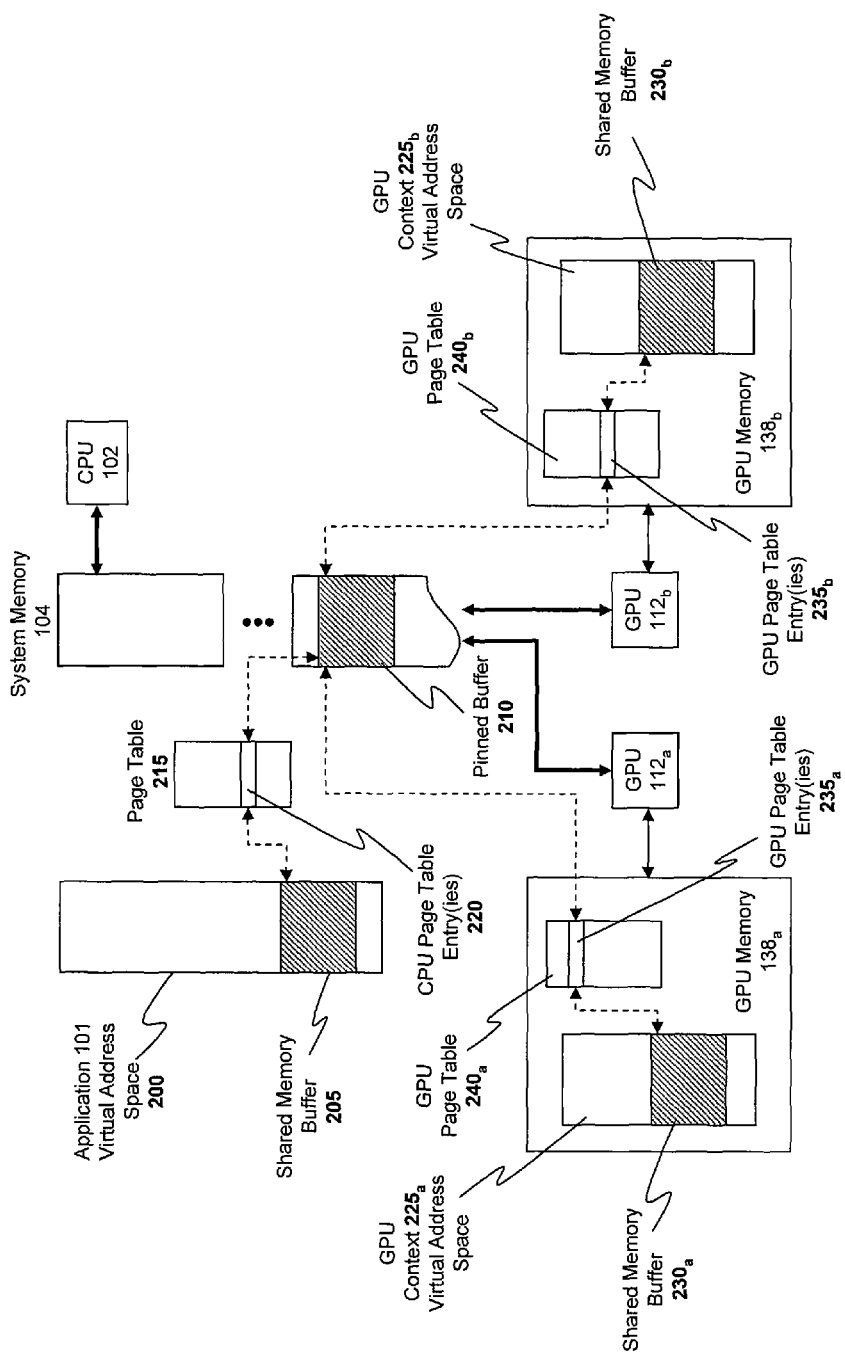
FIG. 2 is a block diagram of a memory buffer in system memory shared among GPUs, according to one embodiment of the present invention.

A plurality of multithreaded processing subsystems $112_a$ to 112 are coupled to memory bridge 105 via a bus or other communication path 113 (e.g., a PCI Express, Accelerated Graphics Port, or HyperTransport link). In the embodiment of FIG. 2, multithreaded processing subsystems $112_a$ to 112 are GPUs that deliver pixels to a display device 110 (e.g., a conventional CRT or LCD based monitor). Each GPU $112_a$ to $112_n$ includes subsystem memory, $138_a$ to $138_n$ respectively, and incorporates one or more parallel processors, $134_a$ to $134_n$ respectively. One example of a GPU, such as $112_a$, is NVIDIA's GeForce® 8 GPU, which has 128 processing cores (i.e., processors), with each core having its own FPU and a set of 1024 registers. Each cluster of 8 processing cores also has 16 KB of shared memory supporting parallel data access. Such an architecture is able to support up to 12,288 concurrent threads, with each thread having its own stack, registers (i.e., a subset of the 1024 registers in a processing core), program counter and local memory.

CPU 102 operates as the control processor of computer system 100, managing and coordinating the operation of other system components. In particular, CPU 102 has primary execution control of multi-GPU aware application 101 in system memory 104. Multi-GPU aware application 101 utilizes a plurality of the GPUs of computer system 100 and transmits instructions to and allocates resources of the GPUs by interacting with GPU device driver 103 (i.e., through the computer system's operating system).

FIG. 2 is a block diagram of a memory buffer in system memory shared between GPUs, according to one embodiment of the present invention. Multi-GPU aware application 101 is allocated a process that runs in virtual memory address space 200 in computer system 100 during its execution. During execution, multi-GPU aware application 101 allocates a memory buffer 205 in virtual memory address space 200 to be shared among GPU $112_a$ and GPU $112_b$ for receiving and storing data for a computationally expensive task to be subdivided and performed by the two GPUs. CPU 102 (e.g., through the operating system of computer system 100) allocates a pinned memory buffer 210 in system memory 104 that corresponds to memory buffer 205 in virtual memory address space 200 of application 101. Page table 215 of a memory management component of the operating system of computer system 100 contains a page table entry (or multiple page table entries, as the case may be) 220 that provides the mapping between the virtual addresses of memory buffer 205 and the physical addresses of pinned memory buffer 210. Additionally, page table entry 220 also includes information to ensure that it is "page-locked" such that it cannot be swapped out of page table 215 for memory management optimization purposes.

Multi-aware application 101 further requests (e.g., via communication with device driver 103 through the operating system) that each of GPU $112_a$ and GPU $112_b$ launch its own internal process to perform its subdivided portion of the computationally expensive task. In response, GPU $112_a$ and GPU $112_b$ each allocate a GPU process (i.e., a "context") $225_a$ and $225_b$, respectively, for the task that runs in a virtual memory address space in GPU memories $138_a$ and $138_b$, respectively. Within each of the virtual memory address spaces, corresponding memory buffers $230_a$ and $230_b$ are allocated by the corresponding GPU and mapped to pinned memory buffer 210 in system memory 104 through page table entries $235_a$ and $235_b$ in corresponding page tables $240_a$ and $240_b$. When a GPU context reads or writes to a virtual address in shared memory buffer $230_a$ and $230_b$, the corresponding address in pinned memory buffer 210 is accessed and provided to the GPU through DMA.

Figure 3:
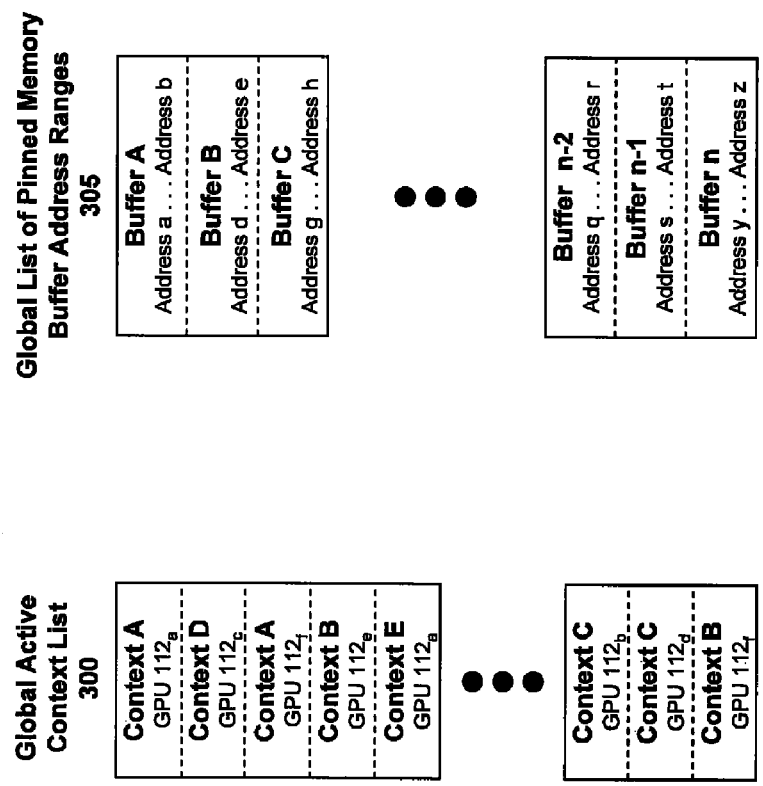
FIG. 3 is a block diagram of data structures used by a GPU device driver to manage shared memory buffers, according to one embodiment of the present invention.

FIG. 3 is a block diagram of data structures used by a GPU device driver to manage shared pinned memory buffers, according to one embodiment of the present invention. Device driver 103 maintains two global lists to manage shared pinned memory buffers among GPUs: an active context global list 300 and a global list 305 of the address ranges for allocated pinned memory buffers. Active context global list 300 is a list of active contexts running on any of the various GPUs of computer system 100 that have access to pinned memory buffers in system memory 104. Global list 305 is a list containing address ranges of pinned memory buffers that are currently allocated in system memory 104. In one embodiment, these lists are implemented using a red-black tree data structure, although those with ordinary skill in the art will recognize that any data structure enabling searching and traversal of elements in the data structure may be used in alternative embodiments, including, arrays, linked lists and any other known data structures.

Figure 4:
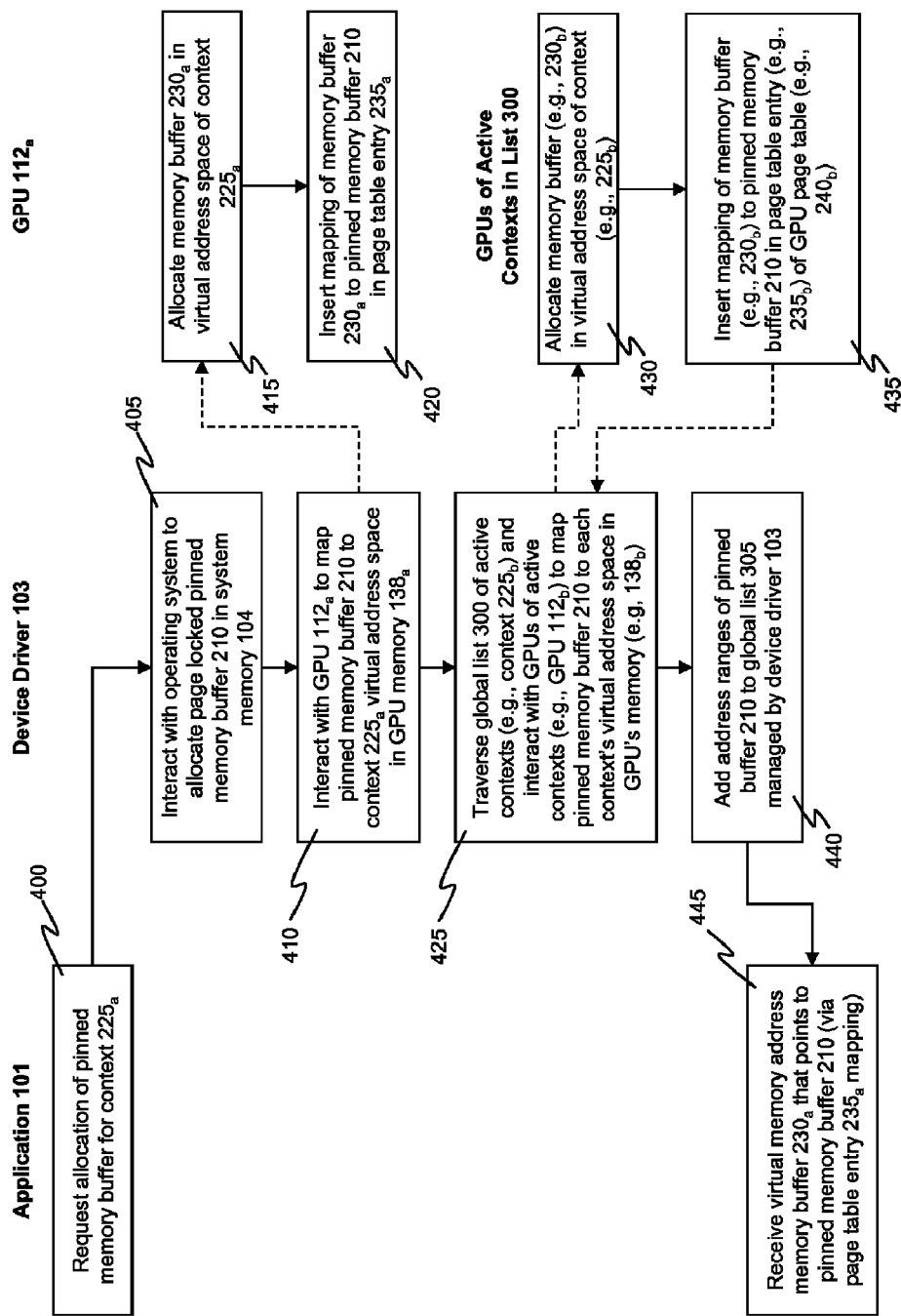
FIG. 4 is a flow diagram of method steps for allocating a pinned memory buffer, according to one embodiment of the present invention.

FIG. 4 is a flow diagram of method steps for allocating a pinned memory buffer, according to one embodiment of the present invention. Although the method steps are described in conjunction with FIGS. 1 through 3, persons skilled in the art will understand that any system configured to perform the method steps, in any order, falls within the scope of the present invention.

In step 400, multi-GPU aware application 101 requests allocation of pinned memory buffer 210 in system memory 104 for context $225_a$ in GPU $112_a$. In response to the request, in step 405, device driver 103 interacts with the operating system of computer system 100 to allocate pinned memory buffer 210 in system memory 104 with a locked page entry 220 in page table 215. In step 410, device driver 103 interacts with GPU $112_a$ to map pinned memory buffer 210 to the virtual address space of context $225_a$ in GPU memory $138_a$. In response, GPU $112_a$ allocates memory buffer $230_a$ in the virtual address space of context $225_a$ in step 415 and inserts a mapping of memory buffer $230_a$ to pinned memory buffer 210 in page table entry $235_a$ in step 420.

In step 425, device driver 103 traverses the active contexts in its global list 300 and, for each active context, interacts with the context's GPU to map pinned memory buffer 210 the context's virtual memory space. For example, with respect to context $225_b$, its GPU $112_b$ allocates memory buffer $230_b$ in its virtual address space in step 430, and in step 435, inserts a mapping of memory buffer $230_b$ to pinned memory buffer 210 in page table entry $235_b$ of page table $240_b$ in GPU memory $138_b$. In step 440, device driver 103 adds the address ranges of pinned memory buffer 210 into an entry in global list 305. In step 445, application 101 receives from device driver 103 a virtual address of memory buffer $230_a$ that points to the beginning of pinned memory buffer 210 (via mappings in page table entry $235_a$).

Figure 5:
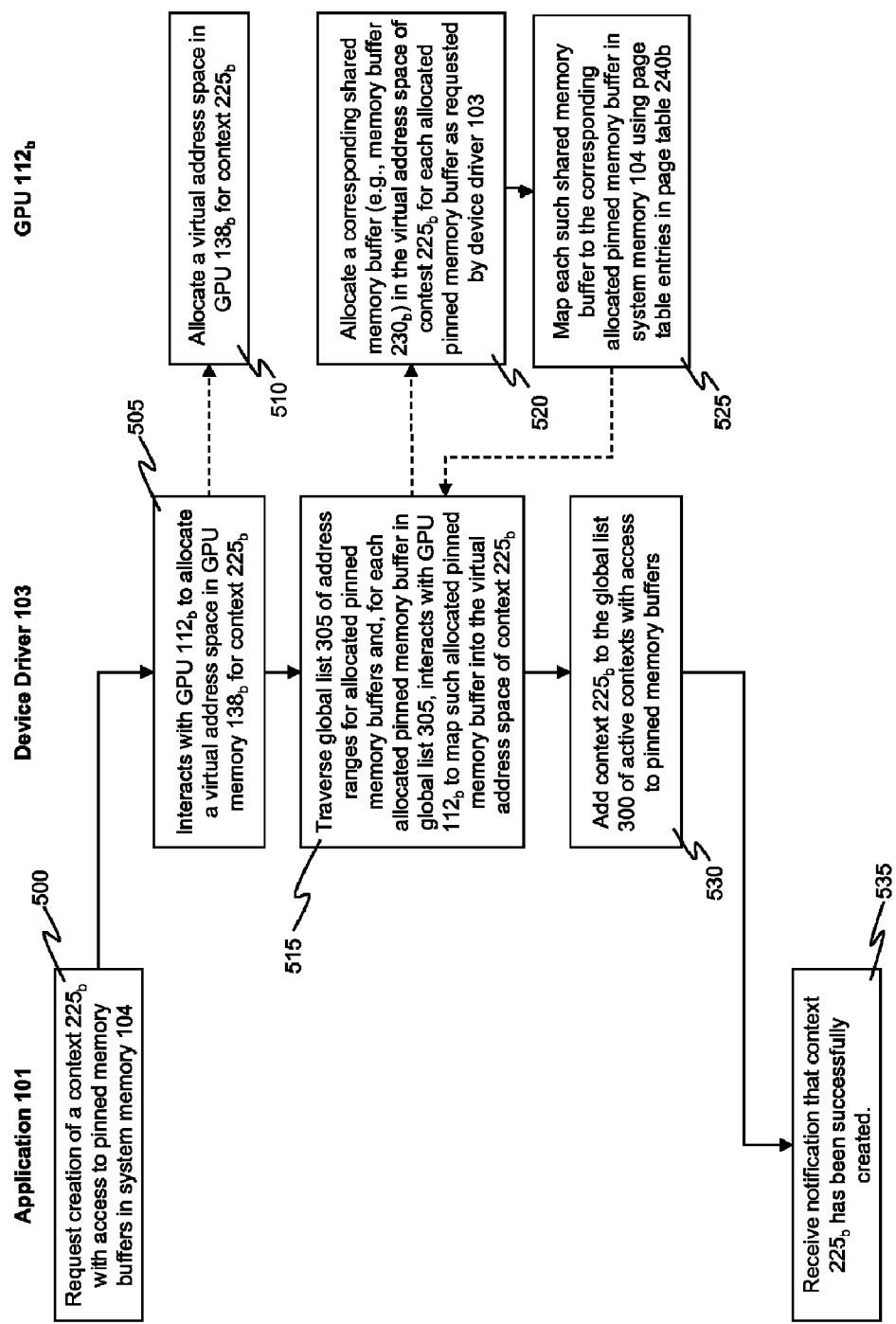
FIG. 5 is a flow diagram of method steps for creating a GPU context with access to pinned memory buffers, according to one embodiment of the present invention.

FIG. 5 is a flow diagram of method steps for creating a GPU context with access to pinned memory buffers, according to one embodiment of the present invention. Although the method steps are described in conjunction with FIGS. 1 through 3, persons skilled in the art will understand that any system configured to perform the method steps, in any order, falls within the scope of the present invention.

In step 500, multi-GPU aware application 101 requests device driver 103 to create a new context $225_b$ in GPU $112_b$ that has access to pinned memory buffers in system memory 104. In step 505, device driver 103 interacts with GPU $112_b$ to allocate a virtual address space in GPU memory $138_b$ for context $225_b$. In step 510, GPU $112_b$ allocates the virtual address space in GPU $138_b$ for context $225_b$. In step 515, device driver 103 traverses global list 305 of address ranges for allocated pinned memory buffers and, for each allocated pinned memory buffer in global list 305, interacts with GPU $112_b$ to map such allocated pinned memory buffer into the virtual address space of context $225_b$. In step 520, GPU $112_b$ allocates a corresponding shared memory buffer, similar to shared memory buffer $230_b$, in the virtual address space of contest $225_b$ for each allocated pinned memory buffer as requested by device driver 103 and, in step 525, GPU $112_b$ maps each such shared memory buffer to the corresponding allocated pinned memory buffer in system memory 104 using page table entries in page table $240_b$. In step 530, device driver 103 adds context $225_b$ to the global list 300 of active contexts with access to pinned memory buffers, and in step 535, multi-GPU aware application 101 receives notification that the creation of context $225_b$ has been successful.

Figure 6B:
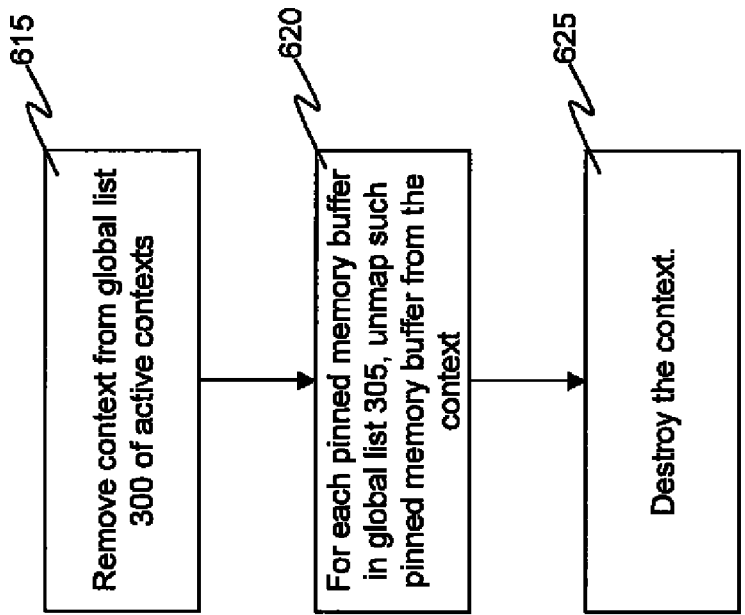
FIG. 6B is a flow diagram of method steps for destroying a GPU context having access to pinned memory buffers in system memory, according to one embodiment of the present invention.
Figure 6A:
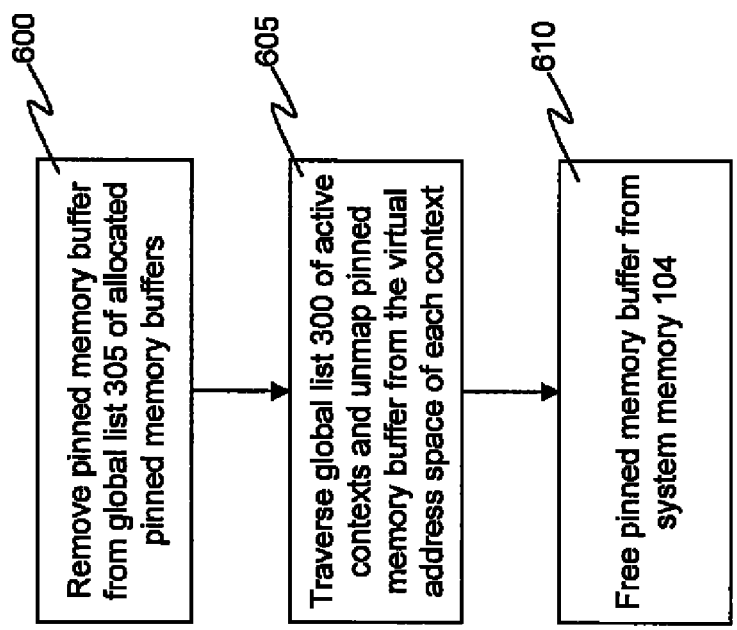
FIG. 6A is a flow diagram of method steps for deallocating a pinned memory buffer in system memory, according to one embodiment of the present invention.

FIG. 6A is a flow diagram of method steps for deallocating a pinned memory buffer in system memory 104, according to one embodiment of the present invention. Although the method steps are described in conjunction with FIGS. 1 through 3, persons skilled in the art will understand that any system configured to perform the method steps, in any order, falls within the scope of the present invention.

In step 600, device driver 103 removes an entry in global list 305 for the pinned memory buffer. In step 605, device driver 103 traverses global list 300 and for each of the active contexts, interacts with such context's GPU to unmap the pinned memory buffer from the context's virtual address space and the page table of the GPU memory. In step 610, the pinned memory buffer is freed from system memory 104.

FIG. 6B is a flow diagram of method steps for destroying a GPU context having access to pinned memory buffers in system memory, according to one embodiment of the present invention. Although the method steps are described in conjunction with FIGS. 1 through 3, persons skilled in the art will understand that any system configured to perform the method steps, in any order, falls within the scope of the present invention.

In step 615, device driver 103 removes the context from global list 300 of active contexts. In step 620, for each pinned memory buffer in global list 305, device driver interacts with the GPU of the context to unmap such pinned memory buffer from the context (i.e., freeing up page table entries, etc.) and in step 625, the context is destroyed.

While the foregoing is directed to embodiments of the present invention, other and further embodiments of the invention may be devised without departing from the basic scope thereof. For example, descriptions herein described GPUs as connected to the CPU through a bus, however, it should be recognized that GPUs may be integrated with the CPU in alternative embodiments and may also share the same memory as the CPU in certain embodiments. Similarly, the foregoing descriptions have described the creation of contexts that have access to all allocated pinned memory buffers in system memory, and conversely, the allocation of pinned memory buffers that may be accessed by all contexts having access to pinned memory buffers. However, it should be recognized that alternative embodiments may enable only certain pinned memory buffers to be accessed by certain contexts.

In addition, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

I claim:

1. A computer-implemented method for allocating a memory buffer within a system memory of a computer system that is configured to be shared among a plurality of graphics processing units (GPUs) included in the computer system, the method comprising:

maintaining a list of processes executing on the plurality of GPUs, wherein each process in the list of processes has access to all shared memory buffers in the system memory;

maintaining a list of address range entries, wherein each address range entry in the list of address range entries comprises an address range for a different shared memory buffer in the system memory;

allocating a page-locked memory buffer in the system memory;

for each GPU executing one or more processes in the list of processes, for each of the one or more processes executing on the GPU, requesting that the GPU map the page-locked memory buffer into a virtual address space associated with the process; and adding an address range entry to the list of address range entries that comprises the address range of the page-locked memory buffer, wherein each process having the page-locked memory buffer mapped into an associated virtual address space has access to the page-locked memory buffer.

2. The method of claim 1, wherein the list of processes and the list of address range entries are red black tree data structures.

3. The method of claim 1, wherein the list of processes and the list of address range entries are maintained in the system memory.

4. The method of claim 1, further comprising, for each GPU executing one or more processes in the list of processes, for each of the one or more processes executing on the GPU, the step of adding a page table entry in a page table of a memory of the GPU to map the page-locked memory into the virtual address space associated with the process.

5. The method of claim 1, wherein each GPU executing one or more processes in the list of processes is configured to access the page-locked memory buffer in the system memory via a direct memory access operation.

6. The method of claim 1, further comprising the step of receiving a request to allocate the page-locked memory buffer from one of the processes in the list of processes.

7. The method of claim 6, further comprising the step of receiving, from a GPU executing the requesting process, a virtual address in a virtual address space associated with the requesting process, wherein the virtual address points to the beginning of the page-locked memory buffer in the system memory.

8. A non-transitory computer-readable medium including instructions that, when executed by a processing unit, causes the processing unit to allocate a memory buffer within a system memory of a computer system, that is configured to be shared among a plurality of graphics processing units (GPUs) included in the computer system, by performing the steps of:

maintaining a list of processes executing on the plurality of GPUs, wherein each process in the list of processes has access to all shared memory buffers in the system memory;

maintaining a list of address range entries, wherein each address range entry in the list of address range entries comprises an address range for a different shared memory buffer in the system memory;

allocating a page-locked memory buffer in the system memory;

for each GPU executing one or more processes in the list of processes, for each of the one or more processes executing on the GPU, requesting that the GPU map the page-locked memory buffer into a virtual address space associated with the process; and adding an address range entry to the list of address range entries that comprises the address range of the page-locked memory buffer, wherein each process having the page-locked memory buffer mapped into an associated virtual address space has access to the page-locked memory buffer.

9. The non-transitory computer-readable medium of claim 8, wherein the list of processes and the list of address range entries are red black tree data structures.

10. The non-transitory computer-readable medium of claim 8, wherein the list of processes and the list of address range entries are maintained in the system memory.

11. The non-transitory computer-readable medium of claim 8, wherein the processing unit further performs the step of, for each GPU executing one or more processes in the list of processes, for each process executing on the GPU, adding a page table entry in a page table of a memory of the GPU to map the page-locked memory into the virtual address space associated with the process.

12. The non-transitory computer-readable medium of claim 8, wherein each GPU executing one or more processes in the list of processes is configured to access the page-locked memory buffer in the system memory via a direct memory access operation.

13. The non-transitory computer-readable medium of claim 8, wherein the processing unit further performs the step of receiving a request to allocate the page-locked memory buffer from one of the processes of the list of processes.

14. The non-transitory computer-readable medium of claim 13, wherein the processing unit further performs the step of receiving, from a GPU executing the requesting process, a virtual address in a virtual address space associated with the requesting process, wherein the virtual address points to the beginning of the page-locked memory buffer in the system memory.

15. A computing system configured to allocate a memory buffer, wherein the memory buffer is shared among graphics processing units (GPUs), the computer system comprising:

a system memory configured to store the memory buffer;
a plurality of GPUs; and
a processor coupled to the system memory, wherein the processor is configured perform the steps of: maintaining a list of processes executing on the plurality of GPUs, wherein each process in the list of processes has access to all shared memory buffers in the system memory, maintaining a list of address range entries, wherein each address range entry in the list of address range entries comprises an address range for a different shared memory buffer in the system memory, allocating a page-locked memory buffer in the system memory, for each GPU executing one or more processes in the list of processes, for each process of the one or more processes executing on the GPU, requesting that the GPU map the page-locked memory buffer into a virtual address space associated with the process, and adding an address range entry to the list of address range entries that comprises the address range of the page-locked memory buffer, wherein each process having the page-locked memory buffer mapped into an associated virtual address space has access to the page-locked memory buffer.

16. The computing system of claim 15, wherein the list of processes and the list of address range entries are stored in the system memory.

17. The computing system of claim 15, wherein the system memory is further configured to store a page table including at least one page table entry comprising a mapping of the page-locked memory buffer to a virtual address space of an application requesting allocation of the memory buffer.

18. The computing system of claim 15, wherein each GPU executing one or more processes in the list of processes is configured to access the page-locked memory buffer in the system memory via a direct memory access operation.

19. The computing system of claim 18, wherein each GPU further comprises a GPU memory including a page table for mapping virtual addresses of a process running in the GPU to physical addresses.

20. The computing system of claim 19, wherein each GPU executing one or more processes in the list of processes, for each of the one or more processes executing on the GPU, adds a page table entry in a page table of a memory of the GPU to map the page-locked memory into the virtual address space associated with the process.

* * * * *